US010910942B2

(12) United States Patent
Hiasa

(10) Patent No.: US 10,910,942 B2
(45) Date of Patent: Feb. 2, 2021

(54) POWER FACTOR IMPROVEMENT CIRCUIT AND SWITCHING POWER SUPPLY DEVICE USING SAME

(71) Applicant: FUJI ELECTRIC CO., LTD., Kawasaki (JP)

(72) Inventor: Nobuyuki Hiasa, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/829,798

(22) Filed: Mar. 25, 2020

(65) Prior Publication Data

US 2020/0389087 A1 Dec. 10, 2020

Related U.S. Application Data

(63) Continuation of application No. PCT/JP2019/007383, filed on Feb. 26, 2019.

(30) Foreign Application Priority Data

Apr. 11, 2018 (JP) .................................. 2018-76368

(51) Int. Cl.
*H02M 1/42* (2007.01)
*H02M 3/156* (2006.01)
(Continued)

(52) U.S. Cl.
CPC ........... *H02M 1/4225* (2013.01); *H02M 1/32* (2013.01); *H02M 3/156* (2013.01); *H02M 2001/0009* (2013.01)

(58) Field of Classification Search
CPC ...... H02M 1/4225; H02M 1/32; H02M 3/156; H02M 2001/0009
See application file for complete search history.

(56) References Cited

U.S. PATENT DOCUMENTS 4,827,151 A * 5/1989 Okado ................ H02M 1/4225
307/66
8,559,203 B2 10/2013 Uemura et al.
(Continued)

FOREIGN PATENT DOCUMENTS

JP 2000-116134 A 4/2000
JP 2010-220330 A 9/2010
(Continued)

OTHER PUBLICATIONS

International Search Report dated Mar. 27, 2019, in corresponding International Patent Application No. PCT/JP2019/007383.
(Continued)

*Primary Examiner* — Jue Zhang

(57) ABSTRACT

A power factor correction circuit including: an error signal generation unit configured to output a signal obtained by amplifying an error between the output voltage of a boost chopper and a referential voltage; an oscillation unit configured to output a triangular wave signal; a zero current detection unit configured to detect zero current in an inductor current of the boost chopper; a drive signal generation unit configured to generate a drive signal for the switching element based on a zero current detection signal, the error signal, and the triangular wave signal; and an input interruption detection unit configured to detect an interruption state of an AC input voltage based on the zero current detection signal. When the input interruption detection unit detects an input interruption state, the oscillation unit controls a slope of the triangular wave signal to be larger than the slope when no input interruption state is detected.

12 Claims, 9 Drawing Sheets

(51) Int. Cl.
  *H02M 1/32* (2007.01)
  *H02M 1/00* (2006.01)

(56) References Cited

U.S. PATENT DOCUMENTS

| | | |
|---|---|---|
| 9,543,836 B2 | 1/2017 | Kurokawa et al. |
| 9,906,149 B2 | 2/2018 | Chen |
| 2010/0302808 A1* | 12/2010 | Uemura .............. H02M 1/4225 363/15 |
| 2011/0141778 A1* | 6/2011 | Wu .................... H02M 1/4225 363/95 |
| 2014/0368741 A1* | 12/2014 | Joo .................... H02M 1/4225 348/730 |
| 2015/0155778 A1 | 6/2015 | Kurokawa et al. |
| 2017/0373604 A1 | 12/2017 | Chen |
| 2018/0278150 A1* | 9/2018 | Zhao ....................... H02M 1/44 |

FOREIGN PATENT DOCUMENTS

| | | | |
|---|---|---|---|
| JP | 2010-279190 A | 12/2010 | |
| JP | 2015-201916 A | 11/2015 | |
| JP | 2016-63603 A | 4/2016 | |
| JP | 2017-229209 A | 12/2017 | |
| WO | 2013/180297 A2 | 12/2013 | |

OTHER PUBLICATIONS

Continuous Conduction Mode Power Factor Correction IC, Mar. 2017, p. 15 (*)https://felib.fujielectric.co.jp/download/details.htm?dataid=1734586&site=japan&lang=ja.

* cited by examiner

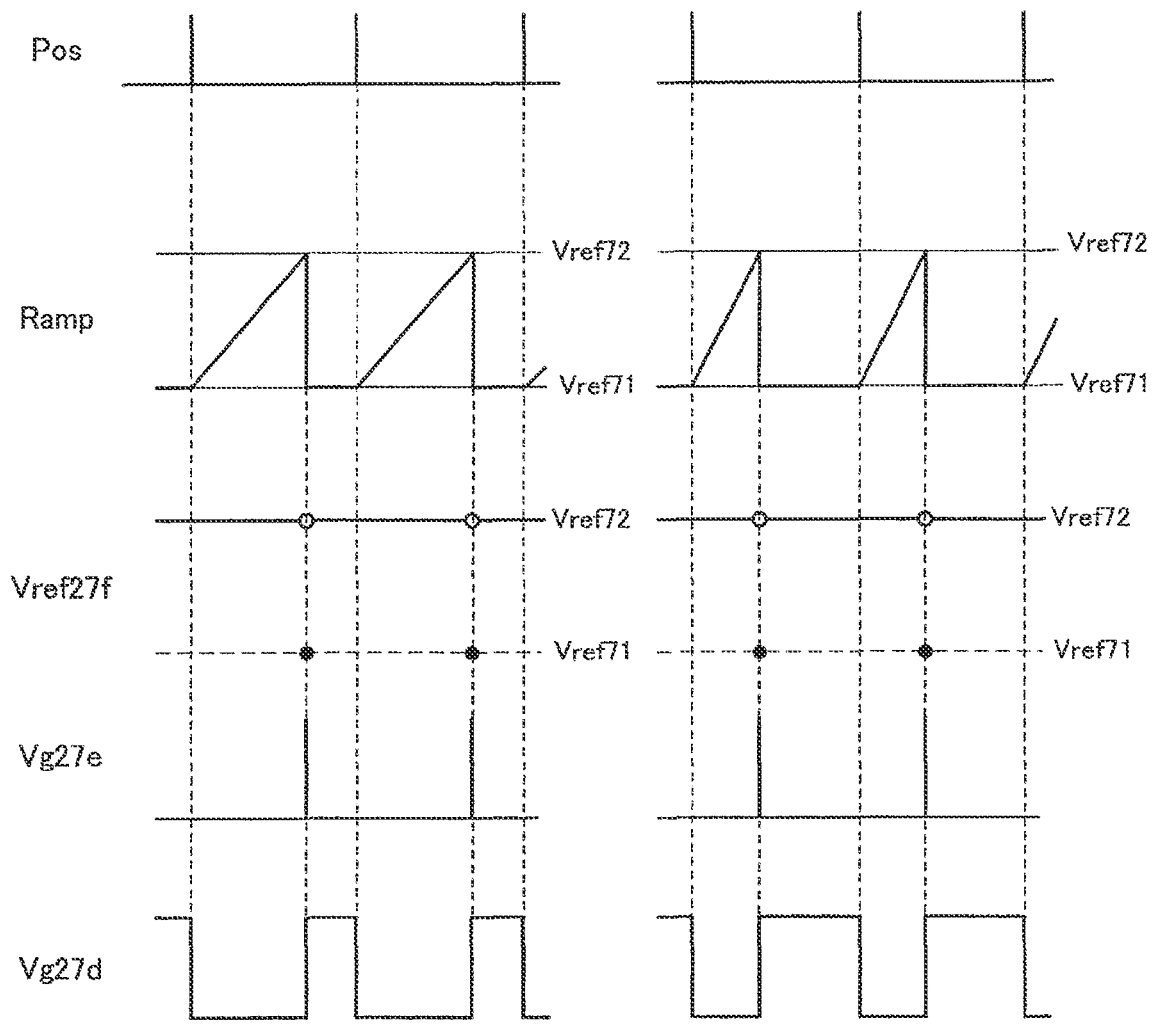

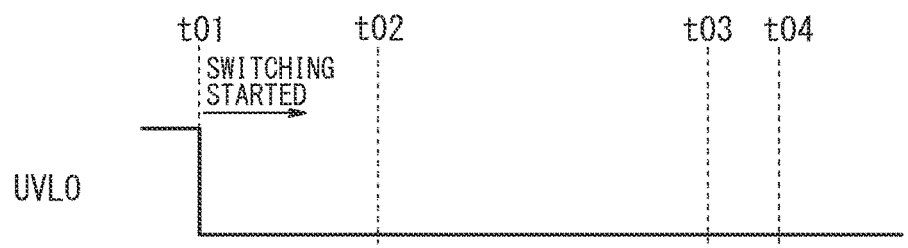
FIG. 6A  UVLO
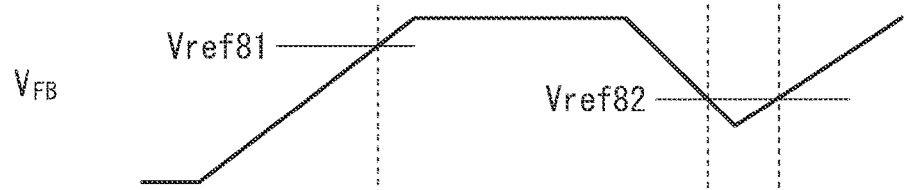
FIG. 6B  $V_{FB}$
FIG. 6C  UVP
FIG. 6D  $S_{FFQ}$
FIG. 6E  $S_{FF\bar{Q}}$
FIG. 6F  GATE VOLTAGE OF 41a

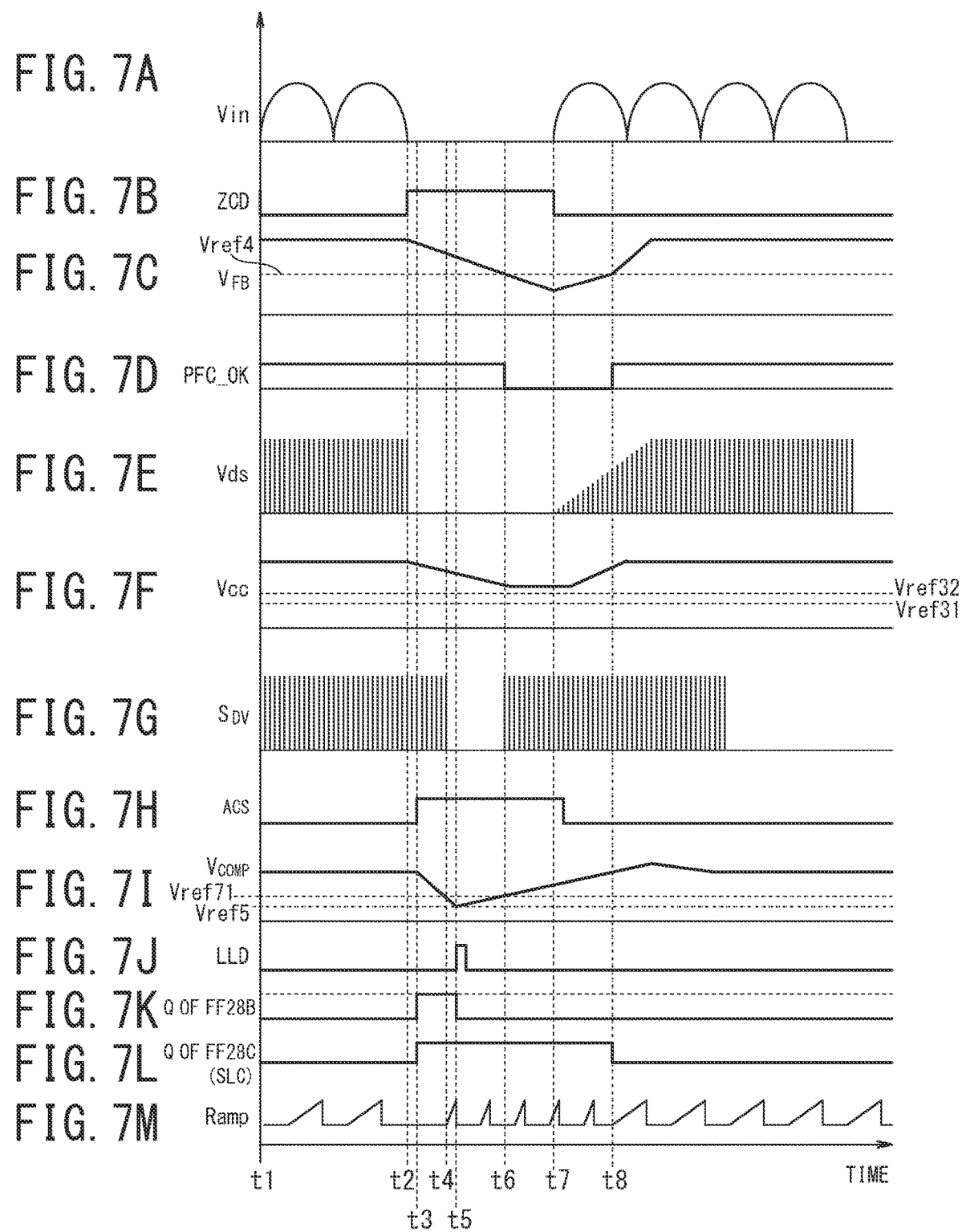

POWER FACTOR IMPROVEMENT CIRCUIT AND SWITCHING POWER SUPPLY DEVICE USING SAME

CROSS-REFERENCE TO RELATED APPLICATION

This application is a continuation application filed under 35 U.S.C. § 111(a) of International Patent Application No. PCT/JP2019/007383, filed on Feb. 26, 2019, which claims foreign priority benefit under 35 U.S.C. § 119 of Japanese Patent Application No. 2018-76368 filed on Apr. 11, 2018 in the Japanese Intellectual Property Office, the contents of both of which are incorporated herein by reference.

TECHNICAL FIELD

The present invention relates to a power factor improvement circuit and a switching power supply device using the same.

BACKGROUND ART

Switching power supply devices with an output power of 75 W or more require a power factor correction function in order to comply with harmonic current regulations. As this type of switching power supply device, there has been proposed one including a full-wave rectifier circuit for rectifying an AC voltage of an AC commercial power supply, a first converter connected to an output side of the full-wave rectifier circuit and formed by an ACDC converter to which a power factor correction (PFC) converter is applied to obtain a predetermined output voltage while correcting power factor, and a second converter connected to an output side of the first converter and formed by a DCDC converter (for example, see PTL 1).

In a conventional technology disclosed in PTL 1 above, the output voltage of the first converter is monitored by an output voltage monitoring circuit using three threshold voltages, whereby an operation state of the power supply circuit is monitored in three stages, and results of the monitoring are output to a VAO clamp control circuit. In the VAO clamp control circuit, the output voltage of a voltage amplifier (an error amplifier) is clamped to an arbitrary voltage in two or more stages.

Accordingly, a maximum output voltage of the voltage amplifier is clamped to two or more kinds of voltages to substantially suppress a maximum on-width of the boosting converter with respect to a switching element, whereby a soft-start function is exhibited.

Additionally, a technology has been proposed that detects the off-state of AC input voltage to allow a soft-start operation to be performed even when the AC input voltage momentarily halts (see PTL 2).

Furthermore, in recent years, control ICs have been proposed that have a function of assisting the responsiveness of an error amplifier to meet the demands of users who desire to suppress overshoot, overvoltage, and excessive undershoot of output voltage, and output voltage reduction in a power factor correction circuit (PFC) by controlling the responsiveness of the power factor correction circuit (see NPL 1).

CITATION LIST

Patent Literature

PTL 1: JP 2010-279190 A
PTL 2: JP 2000-116134 A

Non Patent Literature

NPL 1: "Continuous Conduction Mode Power Factor Correction IC" 15/30, [online], [searched on Feb. 13, 2018], Internet <URL: https://felib.fujielectric.co.jp/download/details.htm?dataid=1734586&site=japan&lang=ja>

SUMMARY OF INVENTION

Technical Problem

In the conventional technology disclosed in PTL 1, a clamp voltage for the error amplifier output voltage of the power factor correction circuit is discretely prepared. Accordingly, depending on the case, the error amplifier output voltage may be smoothly changed in response to input power restoration without being applied to the clamp voltage, so that output power can be supplied, or the output voltage may be applied to the clamp voltage, due to which supply power is limited, which may reduce output of the power supply device. Therefore, there is a problem where each clamp voltage needs to be changed as per power capacity or the like of power supply device.

Additionally, while the conventional technology disclosed in PTL 2 allows for a soft-start operation even at a momentary halt of AC input by detecting the off-state thereof, a problem exists in that it is difficult to suppress output voltage reduction by supply power limit by the soft-start operation.

Furthermore, in the conventional technology disclosed in NPL 1, the function of assisting the responsiveness of the error amplifier of the power factor correction circuit is provided. However, the soft-start function cannot be reset when, during a momentary halt for a relatively short time, control IC power supply voltage decreases, but does not decrease to a voltage where an undervoltage lockout signal UVLO is at H level. Accordingly, upon restoration of AC input, the error amplifier output increases more than necessary due to the assistance on the responsiveness. As a result, switching is restarted with a wide on-width, which may cause overshoot more than when there is no assistance. This is a problem yet to be solved.

Thus, the present invention has been made in view of the problems of the above conventional technologies. It is an object of the present invention to provide a power factor correction circuit capable of suppressing the occurrence of overshoot even at a momentary halt for a short time such that a control circuit is not reset, and soft-start operation cannot be performed, while suppressing changes in output voltage of the power factor correction circuit upon a sudden change in input or a sudden change in load, without increasing power supply system cost, and a switching power supply device using the same.

Solution to Problem

According to one aspect of the present invention, there is provided a power factor correction circuit configured to control a switching element of a boost chopper to obtain a predetermined output voltage from a DC voltage obtained by full-wave rectifying an AC input voltage, the power factor correction circuit including: an error signal generation unit configured to output a signal obtained by amplifying an error between the output voltage of the boost chopper and a referential voltage; an oscillation unit configured to output a triangular wave signal; a zero current detection unit configured to detect zero current in an inductor current of the boost chopper; a drive signal generation unit configured to generate a drive signal for the switching element on a basis of a zero current detection signal of the zero current detection unit, the error signal from the error signal generation unit, and the triangular wave signal from the oscillation unit; and an input interruption detection unit configured to detect an interruption state of the AC input voltage on a basis of the detection signal of the zero current detection unit, wherein when the input interruption detection unit detects an input interruption state, the oscillation unit controls a slope of the triangular wave signal so that the slope becomes larger than the slope when no input interruption state is detected.

Further, according to one aspect of the present invention, there is provided a switching power supply device including the power factor correction circuit described above.

Advantageous Effects of Invention

According to one aspect of the present invention, it is possible to provide a power factor correction circuit capable of suppressing the occurrence of overshoot even at a momentary halt for a short time such that a control circuit is not reset, and soft-start operation cannot be performed, while suppressing changes in output voltage of the power factor correction circuit upon a sudden change in input or a sudden change in load, without increasing power supply system cost, and a switching power supply device using the same.

BRIEF DESCRIPTION OF DRAWINGS

FIGS. 5A to 5B are a signal waveform diagram illustrating operation of the ramp oscillation unit;

FIGS. 6A to 6F are a signal waveform diagram depicting operation of a pull-up control unit;

FIGS. 7A to 7M are a signal waveform diagram depicting operation of the power factor correction circuit according to the present invention;

DESCRIPTION OF EMBODIMENTS

Next, embodiments of the present invention will be described with reference to the drawings. In the following description of the drawings, the same or similar parts are denoted by the same or similar reference signs.

In addition, embodiments given below exemplify devices and methods for embodying the technological idea of the present invention, and the technological idea of the invention does not limit the materials, shapes, structures, arrangements, and the like of components to those below. The technological idea of the present invention can be variously modified within the technological scope defined by the appended claims.

Hereinafter, a description will be given of a switching power supply device according to an embodiment of the present invention with reference to the drawings.

Figure 1:
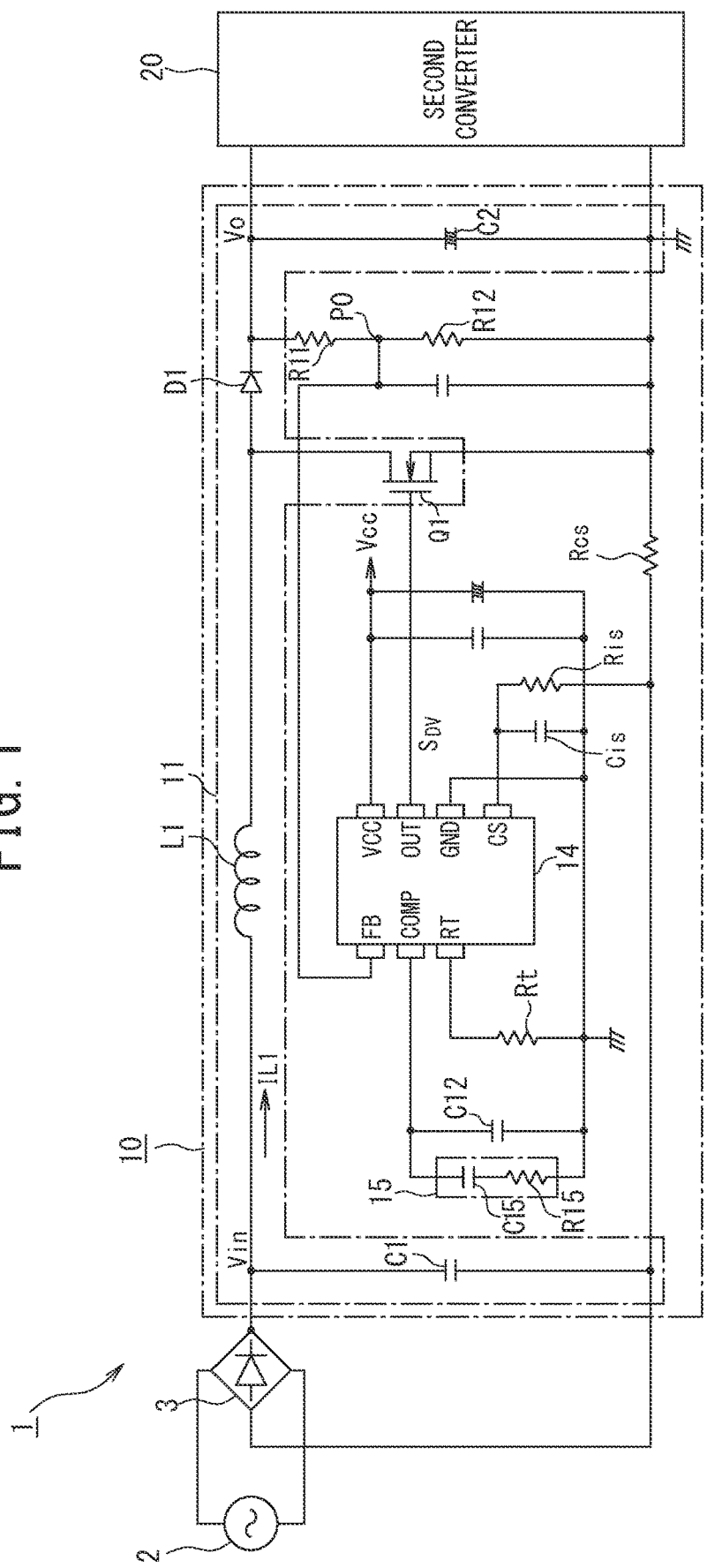
FIG. 1 is a circuit diagram illustrating one embodiment of a switching power supply device including a power factor correction circuit according to the present invention.

As illustrated in FIG. 1, a switching power supply device 1 includes an AC power supply 2 and a full-wave rectification circuit 3 full-wave rectifying an AC input voltage from the AC power supply 2. Additionally, the switching power supply device 1 includes a boost type first converter 10 serving as a power factor correction circuit configured to receive a DC output voltage of the full-wave rectification circuit 3 and a second converter 20 formed using a current resonance type converter.

The first converter 10 includes a boost chopper 11 connected between a positive electrode output side and a negative electrode output side of the full-wave rectification circuit 3. The boost chopper 11 includes a series circuit including a smoothing capacitor C1, an inductor L1 connected to the positive electrode output side of the full-wave rectification circuit 3, and a diode D1. Additionally, the boost chopper 11 includes an output capacitor C2 connected between a cathode side of the diode D1 and the negative electrode output side of the full-wave rectification circuit 3 and a boost switching element Q1 connected between a connection point between the inductor L1 and an anode side of the diode D1 and the negative electrode output side of the full-wave rectification circuit 3. Furthermore, the first converter 10 includes a power factor correction control IC 14 serving as a power factor correction control circuit configured to drive the boost switching element Q1.

The power factor correction control IC 14 includes a control power supply terminal VCC, a feedback terminal FB serving as an output voltage detection terminal, a voltage error detection/compensation terminal COMP, a current detection terminal CS, a resistor connection terminal RT for connecting a resistor that determines an oscillation waveform of a ramp oscillation unit 27, and an output terminal OUT.

Although unillustrated, the control power supply terminal VCC receives a control voltage $V_{cc}$ generated by a voltage induced in an auxiliary winding of a transformer provided in the second converter 20.

The feedback terminal FB is connected to a connection point P0 between voltage dividing resistors R11 and R12 connected between a connection point between the output capacitor C2 and the second converter 20 and ground, and receives a divided voltage of an output voltage $V_o$ of the first converter 10 as a feedback voltage $V_{FB}$.

A capacitor C12 for removing a ripple component of an amplified output of an error amplifier 21 that will be described later and an RC phase compensation circuit 15 are connected in parallel to the voltage error detection/compensation terminal COMP. In the RC phase compensation circuit 15, a resistor R15 and a capacitor C15 are connected in series to reduce, from 0 dB, a gain of a frequency band higher than a frequency twice an input frequency contained in the amplified output of the error amplifier 21 so as to cut the frequency band.

The current detection terminal CS receives, via a resistor $R_{is}$, a detection voltage of a current detection resistor $R_{cs}$ connected between the DC negative electrode output side of the full-wave rectification circuit 3 and ground and detecting an inductor current IL1. Additionally, a filtering capacitor $C_{is}$ is connected between a connection point between the resistor $R_{is}$ and the current detection terminal CS and ground.

The output terminal OUT outputs a pulse-width modulated drive signal $S_{DV}$ for driving the boost switching element Q1.

Figure 2:
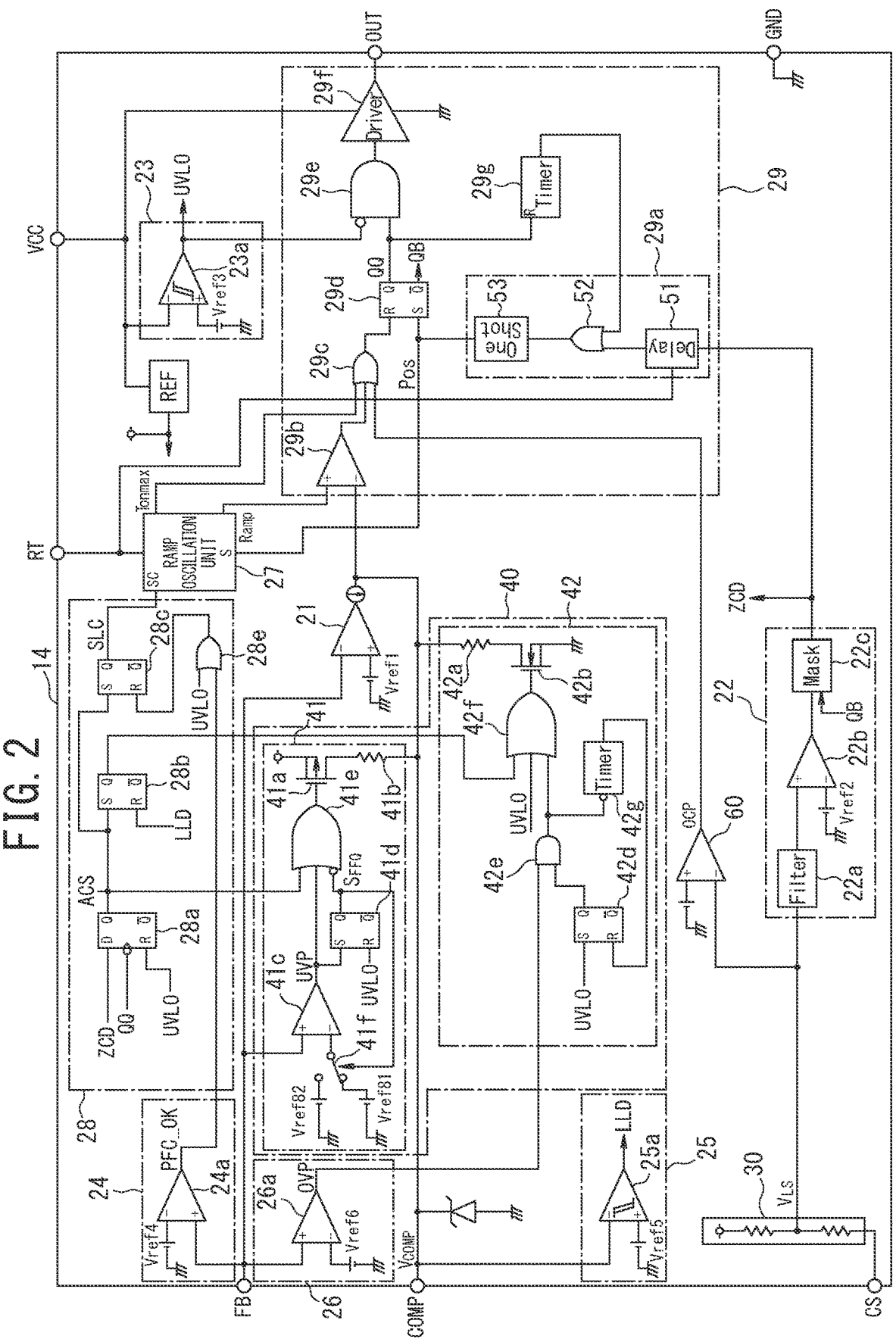
FIG. 2 is a circuit diagram illustrating a specific structure of the power factor correction circuit of FIG. 1.

In addition, as illustrated in FIG. 2, the power factor correction control IC 14 includes the error amplifier 21 configured to serve as an error signal generation unit, a zero current detection unit 22, an undervoltage lockout unit 23, a power factor control operation detection unit 24, a light load state detection unit 25, an overvoltage protection unit 26, the ramp oscillation unit 27 configured to serve as an oscillation unit, an input interruption detection unit 28, and a drive signal generation unit 29.

In the error amplifier 21, an inverting input side thereof receives the feedback voltage $V_{FB}$ input to the feedback terminal FB, and a non-inverting input side thereof receives a referential voltage $V_{ref1}$ for indicating a target output voltage. The error amplifier 21, the capacitor C12, and the RC phase compensation circuit 15 generate an error signal $V_{COMP}$ by amplifying a difference voltage between the referential voltage % $T_{ref1}$ and the feedback voltage $V_{FB}$. The ripple component contained in the output current of the error amplifier 21 is smoothed by the capacitor C12 and the RC phase compensation circuit 15, whereby the error signal $V_{COMP}$ in a steady state becomes substantially a DC voltage.

The zero current detection unit 22 detects a value that is zero or close to zero of a pulsating current flowing through the inductor L1. A negative voltage corresponding to the inductor current IL1 detected by the current detection resistor $R_{cs}$ is pulled up by a level shift unit 30. An output voltage $V_{LS}$ of the level shift unit 30 is higher as an absolute value of current flowing through the current detection resistor $R_{cs}$ is smaller. The output voltage $V_{LS}$ of the level shift unit 30 is subjected to noise removal by a filter 22a, and then input to a non-inverting input terminal of a comparator 22b. An inverting input terminal of the comparator 22b receives a referential voltage $V_{ref2}$ that is a voltage slightly lower than a voltage corresponding to zero current. Accordingly, when the inductor current IL1 is reduced to become zero current by turning off of the boost switching element Q1, the comparator 22b outputs a high-level detection signal.

An output side of the comparator 22b is connected to a mask circuit 22c. The mask circuit 22c receives a negative output signal QB output from a negative output terminal/Q of an RS type flip flop 29d of the drive signal generation unit 29 that will be described later. The mask circuit 22c is a circuit for preventing a malfunction due to noise immediately after turning off the boost switching element Q1. When the negative output signal QB rises to high level (in other words, when the boost switching element Q1 is turned off), the mask circuit 22c does not transmit a change in an output of the comparator 22b that is an input signal to a subsequent stage (maintains an output immediately before the negative output signal QB rises to high level) until a predetermined time (for example, 700 ns) elapses.

On the other hand, when AC input voltage is interrupted, no current flows through the inductor L1, so that the outputs of the comparator 22b and the mask circuit 22c are maintained at high level.

A zero current detection signal ZCD output from the zero current detection unit 22 is output to the input interruption detection unit 28 and the drive signal generation unit 29.

The undervoltage lockout unit 23 includes a comparator 23a having hysteresis characteristics, whose inverting input terminal is connected to the control power supply terminal VCC. A non-inverting input terminal of the comparator 23a receives a referential voltage $V_{ref3}$ (actually including two referential voltages: an upper referential voltage $V_{ref32}$ and a lower referential voltage $V_{ref31}$ due to the hysteresis characteristics), which serves as an undervoltage threshold. The comparator 23a outputs the undervoltage lockout signal UVLO at low level indicating a normal state when the control voltage $V_{cc}$ is higher than the referential voltage $V_{ref3}$, and outputs the undervoltage lockout signal UVLO at high level indicating an undervoltage abnormality when the control voltage $V_{cc}$ is lower than the referential voltage $V_{ref3}$.

The power factor control operation detection unit 24 includes a comparator 24a whose non-inverting input terminal is connected to the feedback terminal FB. An inverting input side of the comparator 24a receives a referential voltage $V_{ref4}$ that serves as a power factor correction operation threshold voltage. Accordingly, the comparator 24a outputs a power factor correction operation detection signal PFC_OK that is at high level when the feedback voltage $V_{FB}$ is equal to or higher than the referential voltage $V_{ref4}$, and that is at low level when the feedback voltage $V_{FB}$ is lower than the referential voltage $V_{ref4}$. An output side of the comparator 24a is connected to one input side of an OR gate 28e provided in the input interruption detection unit 28. As a result, the power factor correction operation detection signal PFC_OK is input to the OR gate 28e.

The light load state detection unit 25 includes a comparator 25a having hysteresis characteristics, whose inverting input terminal receives the error signal $V_{COMP}$. A non-inverting input terminal of the comparator 25a receives a referential voltage $V_{ref5}$ of, for example, 0.60 V and 0.70 V. Accordingly, the comparator 25a outputs a light load detection signal LLD that is at high level when the error signal $V_{COMP}$ is equal to or lower than 0.60V, and then, returns to low level when the error signal $V_{COMP}$ becomes equal to or higher than 0.70 V. The light load detection signal LLD is supplied to the input interruption detection unit 28. The error signal $V_{comp}$ is smaller as load is lighter. Thus, when the load becomes lighter to some extent, the light load detection signal LLD goes to high level.

The overvoltage protection unit 26 includes a comparator 26a whose non-inverting input terminal receives the feedback voltage $V_{FB}$ of the feedback terminal FB. A non-inverting input terminal of the comparator 26a receives a referential voltage $V_{ref6}$ close to the maximum feedback voltage $V_{FB}$. Accordingly, when the feedback voltage $V_{FB}$ is equal to or higher than the referential voltage $V_{ref6}$, it is determined to be an overvoltage state, and a high-level overvoltage protection signal OVP is output. The overvoltage protection signal OVP is supplied to a pull-down control unit 42 of a response control unit 40 that will be described later.

The ramp oscillation unit 27 outputs a sawtooth wave signal that becomes a triangular wave signal. Additionally, after a one-shot pulse $P_{OS}$ output from a one-shot circuit (one example of a one-shot pulse generation unit) 53 is input, if no next one-shot pulse $P_{OS}$ is input for a predetermined time, the ramp oscillation unit 27 outputs a high-level pulse signal Tonmax.

Figure 3:
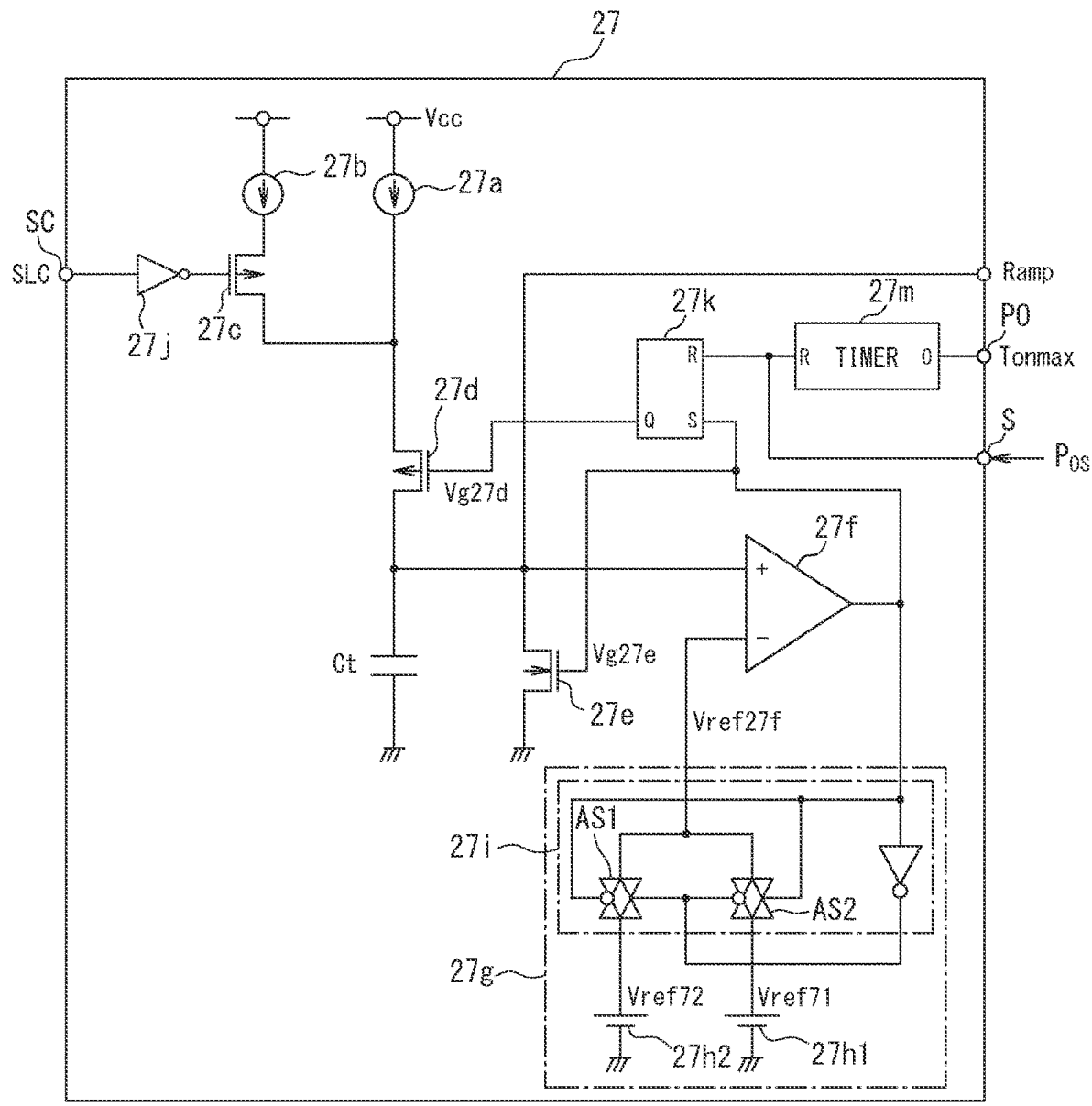
FIG. 3 is a circuit diagram illustrating a specific structure of a ramp oscillation unit of FIG. 2.

FIG. 3 illustrates a specific structure of the ramp oscillation unit 27, and FIGS. 5A to 5B illustrate a signal waveform diagram illustrating operation thereof. As illustrated in FIG. 3, the ramp oscillation unit 27 includes a parallel circuit that includes a first constant current circuit 27a connected to a terminal receiving the control voltage $V_{cc}$ and a series circuit including a second constant current circuit 27b connected to a terminal receiving the control voltage Vcc and a P-channel MOSFET 27c, a P-channel MOSFET 27d and a charge/discharge capacitor Ct connected in series between the parallel circuit and ground, and a discharging N-channel MOSFET 27e connected in parallel with the charge/discharge capacitor Ct. The first constant current circuit 27a and the charge/discharge capacitor Ct connected in series via the P-channel MOSFET 27d form a charging unit.

In addition, the ramp oscillation unit 27 includes a comparator 27f whose non-inverting input terminal is connected to a connection point connecting the P-channel MOSFET 27d with the charge/discharge capacitor Ct and the N-channel MOSFET 27e and a referential voltage generation unit 27g connected to an inverting input terminal of the comparator 27f. The comparator 27f corresponds to one example of a comparison unit configured to compare a charged voltage of the charge/discharge capacitor Ct with a referential voltage $V_{ref27f}$ (whose details will be described later). Additionally, the ramp oscillation unit 27 further includes an RS type flip flop 27k and a timer 27 m.

The referential voltage generation unit 27g includes a first referential power supply 27h1, a second referential power supply 27h2, and a selection unit 27i configured to select the first referential power supply 27h1 and the second referential power supply 27h2. A first referential voltage $V_{ref71}$ (one example of a first reference voltage) of the first referential power supply 27h1 determines a lower limit voltage of the sawtooth wave signal, and a second referential voltage $V_{ref72}$ (one example of a second reference voltage) of the second referential power supply 27h2 determines an upper limit voltage of the sawtooth wave signal. In other words, $V_{ref72} > V_{ref71}$ is set.

The selection unit 27i includes analog switches AS1 and AS2 individually connected in series to the first referential power supply 27h1 and the second referential power supply 27h2. The selection unit 27i selects the second referential voltage $V_{ref72}$ when output of the comparator 27f is at low level, and selects the first referential voltage $V_{ref71}$ when the output of the comparator 27f is at high level. Then, the selected second referential voltage $V_{ref72}$ or first referential voltage $V_{ref71}$ is input as the referential voltage $V_{ref27f}$ to the inverting input terminal of the comparator 27f. Thus, the selection unit 27i corresponds to one example of a referential voltage selection unit configured to select, as the referential voltage $V_{ref27f}$, the first referential voltage $V_{ref71}$ or the second referential voltage $V_{ref72}$ higher than the first referential voltage $V_{ref71}$ to be supplied to the comparator 27f on the basis of an output signal (one example of a comparison signal) of the comparator 27f.

Then, an output terminal of the comparator 27f is connected to a gate of the N-channel MOSFET 27e and a set terminal S of the RS type flip flop 27k. A reset terminal R of the RS type flip flop 27k is connected to a start signal input terminal S that receives the one-shot pulse $P_{OS}$ of the one-shot circuit 53 that will be described later, and an affirmative output terminal Q thereof is connected to a gate of the P-channel MOSFET 27d. The one-shot pulse $P_{OS}$ of the one-shot circuit 53 is input to a reset input terminal R of the timer 27m, and an output terminal O of the timer 27m is connected to a pulse output terminal PO. The timer 27m outputs the pulse signal Tonmax if no high-level one-shot pulse $P_{OS}$ is input for a predetermined time.

Additionally, a gate of the P-channel MOSFET 27c is connected via a logic inverting circuit 27j to a slope control terminal SC that receives a slope control signal SLC from the input interruption detection unit 28, and a connection point between the charge/discharge capacitor Ct and the discharging N-channel MOSFET 27e is connected to a ramp output terminal Ramp. Hereinafter, sign "Ramp" is also used as the sign of a ramp signal output from the ramp output terminal Ramp.

Figure 4:
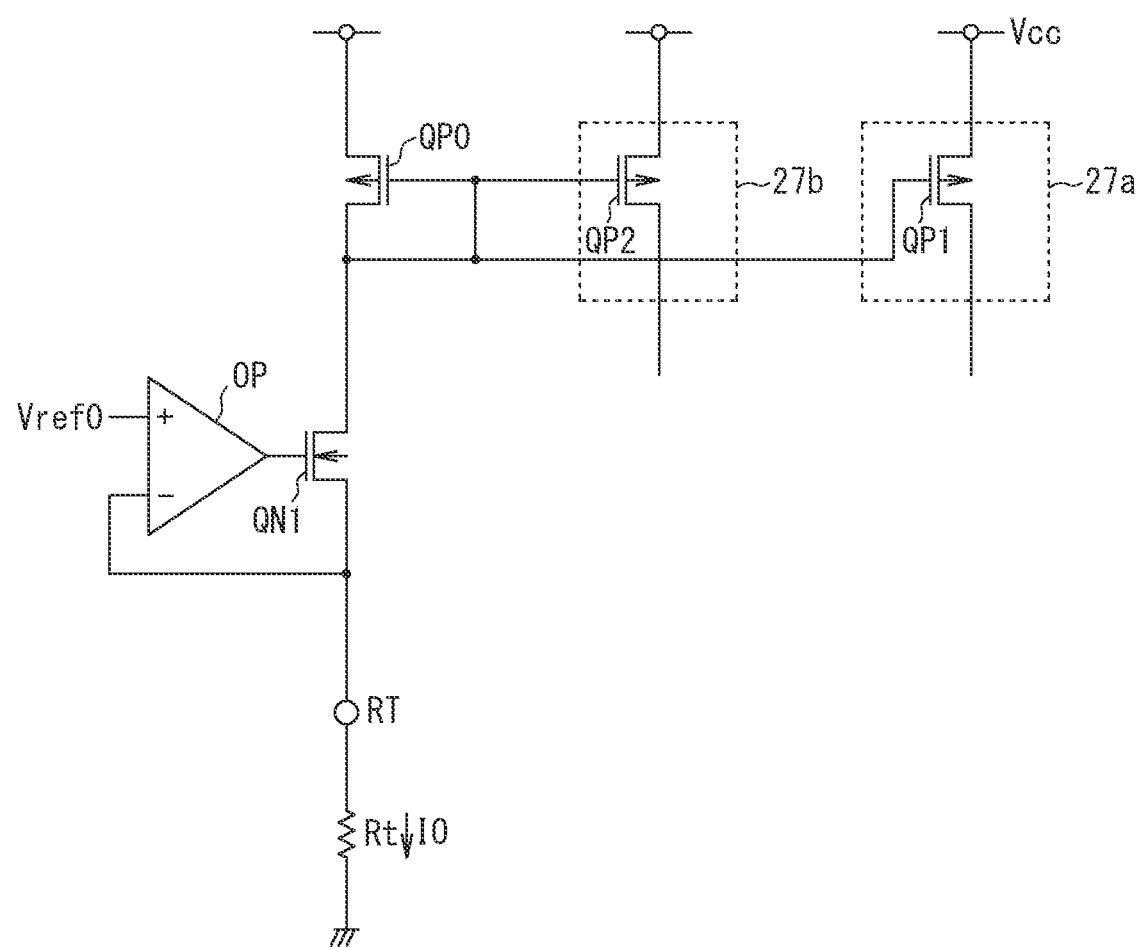
FIG. 4 is a circuit illustrating a specific structure of a first constant current circuit and a second constant current circuit of FIG. 3.

Here, the first constant current circuit 27a and the second constant current circuit 27b form a current mirror circuit, as illustrated in FIG. 4. Specifically, in the current mirror circuit, an input side P-channel MOSFET QP0 arranged in a diode connection in which the gate and drain thereof are connected to each other and an N-channel MOSFET QN1 are connected in series between a terminal receiving the control voltage $V_{cc}$ and a resistor connection terminal RT. A resistor Rt (whose resistance value is also denoted by Rt) that determines the shape of the sawtooth wave signal of the ramp oscillation unit 27 is connected between the resistor connection terminal RT and ground.

An output terminal of an op-amp (operational amplifier) OP is connected to a gate of the N-channel MOSFET QN1. A referential voltage $V_{ref0}$ is input to a non-inverting input side of the operational amplifier OP, and a source of the N-channel MOSFET QN1 is connected to an inverting input terminal thereof. The gate of the input side P-channel MOSFET QP0 is connected to a gate of a P-channel MOSFET QP1 forming the first constant current circuit 27a and a gate of a P-channel MOSFET QP2 forming the second constant current circuit 27b. The referential voltage $V_{ref0}$ is applied to the resistor Rt due to a virtual short circuit of the operational amplifier OP, and a current I0: reference current $I0 = V_{ref0}/Rt$ flows through a series circuit including the QP0, the QN1, and Rt.

In the current mirror circuit, a current proportional to the reference current I0 corresponding to the referential voltage $V_{ref0}$ supplied to the operational amplifier OP flows through the P-channel MOSFETs QP1 and QP2 forming the first constant current circuit 27a.

Then, in the ramp oscillation unit 27, when the voltage of the charge/discharge capacitor Ct reaches the second referential voltage $V_{ref72}$, and the output signal of the comparator 27f, i.e., a gate voltage $V_{g27e}$ of the N-channel MOSFET 27e goes to high level, the N-channel MOSFET 27e is turned on, and electric charge of the charge/discharge capacitor Ct is discharged. Then, when the voltage of the charge/discharge capacitor Ct reaches the first referential voltage $V_{ref71}$, the output signal of the comparator 27f, i.e., the gate voltage $V_{g27e}$ of the N-channel MOSFET 27e goes to low level, which halts the discharging of the charge/discharge capacitor Ct. Thus, the N-channel MOSFET 27e corresponds to one example of a discharging unit configured to discharge the charged electric charge of the charge/discharge capacitor Ct on the basis of the output signal (one example of the comparison signal) of the comparator 27f).

The referential voltage $V_{ref27f}$ input to the inverting input terminal of the comparator 27f is the first referential voltage $V_{ref71}$ only for a short time during which the charge/discharge capacitor Ct is discharged, and becomes the second referential voltage $V_{ref72}$ during the time other than that, as illustrated in FIGS. 5A to 5B.

Note that if a source of the N-channel MOSFET 27e is connected not to a ground potential but to the first referential voltage $V_{ref71}$, a minimum voltage of the sawtooth wave ramp signal Ramp can be more surely set to the first referential voltage $V_{ref1}$. When the slope control signal SLC input to the slope control terminal SC is at low level, the P-channel MOSFET 27c is turned off. Due to that, the charge/discharge capacitor Ct is charged by only a constant current from the first constant current circuit 27a. As a result, the slope of the sawtooth wave ramp signal Ramp becomes moderate, as illustrated in FIG. 5A.

On the other hand, when the slope control signal SLC is at high level, the P-channel MOSFET 27c is turned on, whereby the charge/discharge capacitor Ct is charged by a summation constant current of constant currents of the first constant current circuit 27a and the second constant current circuit 27b. Thus, the slope of the sawtooth wave ramp signal Ramp becomes steep, as illustrated in FIG. 5B.

Oscillation operation of the ramp oscillation unit 27 is started by the one-shot pulse $P_{OS}$ of the one-shot circuit 53 input to the start signal input terminal S. Upon input of the one-shot pulse $P_{OS}$, the RS type flip flop 27k is reset, and a gate voltage $V_{g27d}$ of the P-channel MOSFET 27d goes to low level, whereby charging of the charge/discharge capacitor Ct is started. Note that the voltage of the charge/discharge capacitor Ct immediately before the start of the charging becomes the first referential voltage $V_{ref1}$ as the result of discharging by the N-channel MOSFET 27e, as described above.

Then, when the sawtooth wave ramp signal Ramp reaches the upper-limit second referential voltage $V_{ref2}$, the RS type flip flop 27k is set, and the gate voltage $V_{g27d}$ of the P-channel MOSFET 27d goes to high level, whereby the charging of the charge/discharge capacitor Ct is halted. Additionally, at this time, the charge/discharge capacitor Ct is discharged, and the voltage of the charge/discharge capacitor Ct is maintained at the first referential voltage $V_{ref1}$, as described above. This state continues until the next one-shot pulse $P_{OS}$ is input.

As illustrated in FIG. 2, the input interruption detection unit 28 includes a D type flip flop 28a, two RS type flip flops 28b and 28c for holding an interruption signal, and the OR gate 28e.

The D type flip flop 28a includes a data terminal D, an inverted clock terminal CK, a reset terminal R, and an affirmative output terminal Q. The data terminal D receives the zero current detection signal ZCD of the zero current detection unit 22. The inverted clock terminal CK receives a drive pulse signal QQ output from an affirmative output terminal Q of the RS type flip flop 29d of the drive signal generation unit 29 that will be described later. The reset terminal R receives the undervoltage signal lockout signal UVLO of the undervoltage lockout unit 23.

Accordingly, when it is detected that the zero current detection signal ZCD is at high level, i.e., inductance current is zero current at a time when the drive pulse signal QQ falls, the D type flip flop 28a outputs a high-level input interruption detection signal ACS indicating an interruption state of AC input voltage from the affirmative output terminal Q. This is based on a principle that, as will be described later, unless the AC input voltage is interrupted, a current flowing through the current detection resistor $R_{cs}$ continues to increase when the boost switching element Q1 is in an on-state, so that the zero current detection signal ZCD at the moment when the boost switching element Q1 is turned off should necessarily be at low level. Then, the high-level input interruption detection signal ACS is inverted to low level when the undervoltage lockout signal UVLO at high level is input to the reset terminal R of the D type flip flop 28a or when the zero current detection signal ZCD is at low level (i.e., when the inductance current is not zero current) at the time when the drive pulse signal QQ falls.

The high-level input interruption detection signal ACS output from the affirmative output terminal Q of the D type flip flop 28a is held in the two RS type flip flops 28b and 28c. The RS type flip flop 28b is a flip flop (which is, for example, formed by a D type flip flop circuit whose data input terminal is fixed at high level, and whose clock terminal receives the input interruption detection signal ACS) set at a rising edge of the input interruption detection signal ACS to the set terminal S. The input interruption detection signal ACS continues to be held until the light load detection signal LLD goes to high level, and the held input interruption detection signal ACS is supplied to the pull-down control unit 42 that will be described later.

Additionally, the RS type flip flop 28c is a set-priority flip flop, and the input interruption detection signal ACS continues to be held at high level until the input interruption detection signal ACS goes to low level and the undervoltage lockout signal UVLO or the power factor correction operation detection signal PFC_OK goes to high level (i.e., until an output signal of the OR gate 28e goes to high level). Then, the held input interruption detection signal ACS is input as the slope control signal SLC to the slope control terminal SC of the ramp oscillation unit 27.

In addition, the input interruption detection signal ACS output from the affirmative output terminal Q of the D type flip flop 28a is supplied to a pull-up control unit 41 that will be described later.

Response characteristics of the error signal $V_{COMP}$ are controlled by the response control unit 40. The response control unit 40 includes the pull-up control unit 41 configured to pull up output of the error amplifier 21 and the pull-down control unit 42 configured to pull down the output of the error amplifier 21 to fix to a low voltage (low potential) lower than a threshold voltage of the undervoltage lockout unit 23.

The pull-up control unit 41 includes a series circuit including a P-channel MOSFET 41a and a pull-up resistor 41b connected between an internal bias power supply terminal and the output of the error amplifier 21. Additionally, the pull-up control unit 41 includes a comparator 41c, an RS type flip flop 41d, and an OR gate 41e.

A non-inverting input terminal of the comparator 41c receives the feedback voltage $V_{FB}$ input to the feedback terminal FB, and an inverting input terminal thereof receives a first referential voltage $V_{ref81}$ and a second referential voltage $V_{ref82}$ via a selection switch 41f. Here, the first referential voltage $V_{ref81}$ and the second referential voltage $V_{ref82}$ are set such that the first referential voltage $V_{ref81}$ is larger than the second referential voltage $V_{ref82}$ ($V_{ref81} > V_{ref82}$).

Then, the selection switch 41f selects the first referential voltage $V_{ref81}$ when an output signal output from an affirmative output terminal Q of the RS type flip flop 41d is at low level, and selects the second referential voltage $V_{ref82}$ when at high level.

A set terminal S of the RS type flip flop 41d receives an output signal UVP of the comparator 41c, and a reset terminal R thereof receives the undervoltage lockout signal UVLO of the undervoltage lockout unit 23. The output signal output from the affirmative output terminal Q of the RS type flip flop 41d is supplied to the selection switch 41f and a negative logic input terminal of the OR gate 41e.

An input terminal of the OR gate 41e receives the input interruption detection signal ACS output from the D type flip flop 28a of the input interruption detection unit 28 and the output signal UVP of the comparator 41c, and the negative logic input terminal thereof receives an output signal $S_{FFQ}$ of the RS type flip flop 41d. Then, an output terminal of the OR gate 41e is supplied to a gate of the P-channel MOSFET 41a.

Here, operation of the pull-up control unit 41 will be described with reference to FIGS. 6A to 6F.

First, as illustrated in FIG. 6A, when the undervoltage lockout signal UVLO goes to low level at a time point t01, and switching of the boost switching element Q1 of the boost chopper 11 is started, an output voltage of the boost chopper 11 increases accordingly. In response to this, the feedback voltage $V_{FB}$ starts to increase, as illustrated in FIG. 6B. At this time, the selection switch 41f selects the first referential voltage $V_{ref81}$ so that the output signal $S_{FFQ}$ of the affirmative output terminal Q of the RS type flip flop 41d is maintained at low level.

After that, when the feedback voltage $V_{FB}$ increases and reaches the first referential voltage $V_{ref81}$ at a time point t02, the output signal UVP of the comparator 41c goes to high level, as illustrated in FIG. 6C. As a result, the RS type flip flop 41d is set, and the output signal $S_{FFQ}$ output from the affirmative output terminal Q is inverted from low level to high level, as illustrated in FIG. 6D.

Due to that, the selection switch 41f selects the second referential voltage $V_{ref82}$. Then, for example, when load becomes heavy and switches from light load state to heavy load state, and the feedback voltage $V_{FB}$ decreases to not more than the second referential voltage $V_{ref82}$ at a time point t03, the output signal UVP of the comparator 41c is inverted from high level to low level, as illustrated in FIG. 6C. At this time, since the undervoltage lockout signal UVLO is maintained at low level, the RS type flip flop 41d maintains the set state.

When assuming that an AC input voltage is input in this state, the input interruption detection signal ACS output from the affirmative output terminal Q of the D type flip flop 28a of the input interruption detection unit 28 is maintained at low level. Accordingly, the output signal of the OR gate 41e is inverted from high level to low level, and supplied to the gate of the P-channel MOSFET 41a. As a result, the P-channel MOSFET 41a is turned on, and the output of the error amplifier 21 is pulled up. The feedback voltage $V_{FB}$ is a voltage obtained by dividing the output voltage $V_o$ of the first converter 10, i.e., the output voltage of the boost chopper 11. In other words, the feedback voltage $V_{FB}$ is a voltage based on the output voltage of the boost chopper 11. Thus, the pull-up control unit 41 is configured to pull up the output voltage of the error amplifier 21 when the load switches from the light load state to the heavy load state on the basis of the output voltage of the boost chopper 11.

When the value of the error signal $V_{COMP}$ is increased by the pull-up of the output of the error amplifier 21, the on-width of the boost switching element Q1 is expanded and thereby larger energy is transmitted to the output side, as a result of which the output voltage $V_o$ and the feedback voltage $V_{FB}$ that is the divided voltage thereof turn to increase. Then, when the feedback voltage $V_{FB}$ exceeds the second referential voltage $V_{ref82}$ at a time point t04, the output signal UVP of the comparator 41c returns to high level, and the high-level output signal UVP is supplied to the gate of the P-channel MOSFET 41a via the OR gate 41e. Thus, the P-channel MOSFET 41a is turned off, which halts the pull-up operation.

In addition, when the control voltage Vcc decreases, and the undervoltage lockout signal UVLO goes from low level to high level, the output signal of the affirmative output terminal Q of the reset-priority RS type flip flop 41d goes to low level, whereby the output signal of the OR gate 41e goes to high level, as a result of which the P-channel MOSFET 41a is turned off, which halts the pull-up operation on the output of the error amplifier 21.

Thus, the pull-up control unit 41 halts the pull-up operation during a time in which the feedback voltage $V_{FB}$ exceeds the first referential voltage $V_{ref81}$ and then becomes equal to or lower than the second referential voltage $V_{ref82}$ and during a time in which the control voltage $V_{cc}$ is equal to or lower than the referential voltage $V_{ref3}$, and the undervoltage lockout signal UVLO is at high level. Therefore, at startup or in an undervoltage lockout state, the responsiveness is improved, which can suppress the occurrence of an overvoltage state.

The pull-down control unit 42 includes a series circuit including a pull-down resistor 42a and an N-channel MOSFET 42b connected between an output terminal of the error amplifier 21 and ground. Additionally, the pull-down control unit 42 includes an RS type flip flop 42d, an AND gate 42e, an OR gate 42f, and a timer 42g.

A reset terminal of the RS type flip flop 42d receives an output signal of the timer 42g, a set terminal thereof receives the undervoltage signal UVLO, and an output signal output from an affirmative output terminal Q thereof is supplied to one input terminal of the AND gate 42e.

The other input terminal of the AND gate 42e receives the overvoltage protection signal OVP of the overvoltage protection unit 26, and an output signal of the AND gate 42e is input to the OR gate 42f and the timer 42g.

When the input signal to the timer 42g, i.e., the output signal of the AND gate 42e continues to be maintained at high level for a predetermined period, the timer 42g outputs a high-level pulse signal to reset the RS type flip flop 42d. This can limit a period during which the output of the AND gate 42e goes to high level, and thereby the N-channel MOSFET 42b is turned on.

Note that the RS type flip flop 42d is set by the undervoltage lockout signal UVLO at startup of the switching power supply device 1. Thus, when the overvoltage protection signal OVP goes to high level, the output of the AND gate 42e goes to high level to turn on the N-channel MOSFET 42b. Then, as described above, when the output signal of the AND gate 42e continues to be maintained at high level for a predetermined period, the RS type flip flop 42d is reset, which terminates the pull-down operation of the pull-down control unit 42. After this, the pull-down operation by the overvoltage protection signal OVP does not become active until the undervoltage lockout signal UVLO goes to high level again.

The OR gate 42f receives, besides the output signal of the AND gate 42e, the undervoltage lockout signal UVLO, and the output signal output from the affirmative output terminal Q of the RS type flip flop 28b of the input interruption detection unit 28. An output signal of the OR gate 42f is input to a gate of the N-channel MOSFET 42b.

Thus, in the pull-down control unit 42, when the affirmative output of the RS type flip flop 28b or the undervoltage lockout signal UVLO goes to high level (the undervoltage lockout unit 23 goes into an operating state) or when the overvoltage protection signal OVP goes to high level, and the RS type flip flop 42d is set, the N-channel MOSFET 42b is turned on. As a result, the error signal $V_{COMP}$ is pulled down and fixed to a lower voltage than a switching halt threshold ($V_{ref71}$).

The drive signal generation unit 29 includes a start signal generation unit 29a, a pulse width modulation comparator (one example of a pulse width modulation unit) 29*b*, an OR gate 29*c*, an RS type flip flop 29*d*, an AND gate 29*e*, a driver 29*f*, and a restart timer 29*g*.

The start signal generation unit 29*a* includes a delay circuit 51 that receives the zero current detection signal ZCD of the zero current detection unit 22 mentioned above, an OR gate 52 that receives a delay signal of the delay circuit 51 and an output signal of the restart timer 29*g*, and a one-shot circuit 53 that outputs a one-shot signal on the basis of an output signal of the OR gate 52.

A non-inverting input terminal of the pulse width modulation comparator 29*b* receives a ramp signal Ramp output from the ramp oscillation unit 27, and an inverting input terminal thereof receives the error signal $V_{COMP}$, and an output terminal thereof outputs a pulse width modulation signal.

The OR gate 29*c* receives the pulse width modulation signal of the pulse width modulation comparator 29*b*, the pulse signal Tonmax output from the ramp oscillation unit 27, and an overcurrent protection signal OCP from an overcurrent protection unit 60.

A set terminal S of the RS type flip flop 29*d* receives a one-shot pulse $P_{OS}$ of the start signal generation unit 29*a*, and a reset terminal R thereof receives an output signal of the OR gate 29*c*. A drive pulse signal QQ output from an affirmative output terminal Q of the RS type flip flop 29*d* is input to the input interruption detection unit 28 mentioned above, and also input to the restart timer 29*g*. Additionally, a negative output signal QB output from a negative output terminal/Q of the RS type flip flop 29*d* is input to the mask circuit 22*c*.

The AND gate 29*e* receives the drive pulse signal QQ of the RS type flip flop 29*d*, and a negative logic input terminal of the AND gate 29*e* receives the undervoltage lockout signal UVLO. An output signal of the AND gate 29*e* is supplied to the driver 29*f*, and a drive signal $S_m$, output from the driver 29*f* is output from the output terminal OUT to a gate of the boost switching element Q1 of the boost chopper 11.

Next, operation of the above embodiment will be described with reference to FIGS. 7A to 7M.

In a state where the AC power supply 2 supplies AC power to the full-wave rectification circuit 3, the AC power is full-wave rectified by the full-wave rectification circuit 3, as a result of which an input voltage $V_{in}$ having a voltage waveform having a shape of a folded-back half cycle sine wave illustrated in FIG. 7A is supplied to the inductor L1. In the state where the AC power is supplied, an unillustrated power supply circuit supplies the control voltage $V_{cc}$ to the power factor correction control IC 14.

Then, the input voltage Vin is boosted by the inductor L1 and the boost switching element Q1, passes through the diode D1, is smoothed by the output capacitor C2, and supplied as a constant output power that is a substantially DC voltage to the second converter 20. The second converter 20 is formed by, for example, an LLC current resonance type converter including a resonance capacitor, an insulating transformer, and a switching element, and outputs stabilized DC power from a secondary side of the transformer.

Here, when the AC power is normally supplied, the drive signal generation unit 29 supplies the drive signal $S_{DV}$ illustrated in FIG. 7G to the gate of the boost switching element Q1, and the feedback voltage $V_{FB}$ input to the feedback terminal FB of the power factor correction control IC 14 is maintained to be a substantially constant voltage, as illustrated in FIG. 7B.

Due to that, the error signal $V_{comp}$ also has a substantially constant value, as illustrated in FIG. 7I.

In this state, the voltage corresponding to the inductor current detected by the current detection resistor $R_{cs}$, which is input to the current detection terminal CS of the power factor correction control IC 14, is a negative voltage whose absolute value becomes larger as the current flowing through the current detection resistor $R_{cs}$ increases. If the current flowing through the current detection resistor $R_{cs}$ is zero, the voltage of the current detection terminal CS is also zero. The current input to the current detection terminal CS is level-shifted by the level shift unit 30 and converted to a positive voltage. The converted output voltage $V_{LS}$ is higher as the current flowing through the current detection resistor $R_{cs}$ is smaller.

The output voltage $V_{LS}$ is supplied to the zero current detection unit 22 and compared with the referential voltage $V_{ref2}$ slightly lower than the voltage corresponding to the zero current by the comparator 22*b*, as a result of which when $V_{LS} \geq V_{ref2}$, the output signal of the comparator 22*b* goes to high level, so that the inductance current can be determined to be zero current. The output signal of the comparator 22*b* is input to the mask circuit 22*c*, whereby the zero current detection signal ZCD can be made a detection signal from which the influence of noise immediately after switching has been eliminated.

The zero current detection signal ZCD is supplied to the start signal generation unit 29*a* of the drive signal generation unit 29, delayed by the delay circuit 51, and then supplied to the one-shot circuit 53 via the OR gate 52. The one-shot pulse $P_{OS}$ output from the one-shot circuit 53 is supplied to the set terminal of the RS type flip flop 29*d* to set the RS type flip flop 29*d*. In other words, a critical operation is performed in which, at a time when the boost switching element Q1 is turned off and it is detected that the inductor current is zero, the boost switching element Q1 is turned on. When the boost switching element Q1 is turned on, the zero current detection signal ZCD returns to low level in a short time, so that the zero current detection signal ZCD at this time becomes a short pulse signal.

Simultaneously with this, the zero current detection signal ZCD is supplied to a data terminal D of the D type flip flop 28*a* of the input interruption detection unit 28. A negative logic clock terminal of the D type flip flop 28*a* receives the drive pulse signal QQ output from the affirmative output terminal Q of the RS type flip flop 29*d* of the drive signal generation unit 29. In this case, the drive pulse signal QQ supplies a delay signal delayed with respect to the zero current detection signal ZCD by the delay circuit 51 to the one-shot circuit 53 and forms the one-shot pulse $P_{OS}$, so that the drive pulse signal QQ rises later with respect to rising of the zero current detection signal ZCD.

Accordingly, the D type flip flop 28*a* outputs the state of the zero current detection signal ZCD at the falling edge of the drive pulse signal QQ. At this time, in the state where AC input voltage is supplied, the zero current detection signal ZCD is at low level except for cases where the current flowing through the current detection resistor $R_{cs}$ is zero or a very small current. On the other hand, when the boost switching element Q1 is in the on-state, the current through the current detection resistor $R_{cs}$ can continue to increase, so that the zero current detection signal ZCD at the moment when the boost switching element Q1 is turned off should necessarily be at low level.

Due to that, the D type flip flop 28*a* stores the value of the zero current detection signal ZCD at the falling edge of the drive pulse signal QQ that determines the turning off of the boost switching element Q1. Thus, when the signal output from the affirmative output terminal Q of the D type flip flop 28a is not at low level but at high level, it can be determined that AC input voltage is being interrupted.

Accordingly, the output signal output from the affirmative output terminal Q of the D type flip flop 28a can be defined as the input interruption detection signal ACS.

Since the AC input voltage is input between a time point t1 and a time point t2, and the full-wave rectification circuit 3 supplies a full-wave rectified output to the inductor L1, the input interruption detection signal ACS output from the D type flip flop 28a is maintained at low level, as illustrated in FIG. 7H.

Thus, the RS type flip flops 28b and 28c are also maintained in the reset state.

The input interruption detection signal ACS output from the D type flip flop 28a is supplied to the OR gate 41e of the pull-up control unit 41. It is assumed that, in the pull-up control unit 41, the feedback voltage $V_{E-13}$ exceeds the first referential voltage $V_{ref81}$, and the RS type flip flop 41d is set. In this state, when the selection switch 41f selects the second referential voltage $V_{ref82}$, and the feedback voltage $V_{FB}$ is higher than the second referential voltage $V_{ref82}$, the output signal UVP of the comparator 41c is at high level. Thus, the output signal UVP of the comparator 41c is supplied to the gate of the P-channel MOSFET 41a via the OR gate 41e, whereby the P-channel MOSFET 41a is turned off, which halts the pull-up operation on the output of the error amplifier 21.

On the other hand, since the RS type flip flop 28b of the input interruption detection unit 28 is in the reset state, a low-level output signal is supplied to the OR gate 42f of the pull-down control unit 42. In this case, in the comparator 26a of the overvoltage protection unit 26, the feedback voltage $V_{FB}$ is lower than the referential voltage $V_{ref6}$, and therefore, the overvoltage protection signal OVP is at low level. Due to this, the output of the AND gate 42e is maintained at low level. Then, since the undervoltage lockout signal UVLO is also at low level, the output signal of the OR gate 42f goes to low level, whereby the N-channel MOSFET 42b is controlled to be in an off-state. This halts pull-down operation on the error amplifier 21 by the pull-down control unit 42.

Furthermore, since the RS type flip flop 28c of the input interruption detection unit 28 is maintained in the reset state, a low-level output signal is supplied to the slope control terminal SC of the ramp oscillation unit 27. Thus, in the ramp oscillation unit 27, the low-level output signal is logically inverted by the logic inverting circuit 27j and supplied to the gate of the P-channel MOSFET 27c, whereby the P-channel MOSFET 27c is turned off.

Accordingly, only the constant current of the first constant current circuit 27a is supplied to the charge/discharge capacitor Ct, so that electric charge of the charge/discharge capacitor Ct is gradually accumulated.

Thus, as illustrated in FIG. 5A, when the inter-terminal voltage of the charge/discharge capacitor Ct gradually increases and reaches the second referential voltage $V_{ref72}$ the charge/discharge capacitor Ct is discharged, and the inter-terminal voltage thereof drops at once to the first referential voltage $V_{ref71}$, whereby a sawtooth wave with a small slope is generated. The sawtooth wave with a small slope is supplied as the ramp signal Ramp to the pulse width modulation comparator 29b of the drive signal generation unit 29.

The pulse width modulation comparator 29b generates a pulse width modulation signal on the basis of the ramp signal Ramp and the error signal $V_{COMP}$, and the pulse width modulation signal is supplied to the reset terminal R of the RS type flip flop 29d via the OR gate 29c. The drive pulse signal QQ is output from the affirmative output terminal Q of the RS type flip flop 29d, and the negative output signal QB is output from the negative output terminal/Q thereof. The drive pulse signal QQ is output from the output terminal OUT to the gate of the boost switching element Q1 via the AND gate 29e and the driver 29f, and is also output to the D type flip flop 28a of the input interruption detection unit 28.

Next, when, in the state where the AC power is normally input, the AC power supply 2 momentarily halts at the time point t2, the input voltage $V_{in}$ is not input to the inductor L1 from the full-wave rectification circuit 3 (the capacitance of the smoothing capacitor C1 is small, so that the electric charge of the C1 is lost in a short time), as a result of which the feedback voltage VFB decreases gradually, as illustrated in FIG. 7C. Simultaneously with this, the control voltage $V_{cc}$ supplied to the power factor correction control IC 14, also, decreases gradually, as illustrated in FIG. 7F.

Additionally, in the drive signal generation unit 29, the output of the drive signal $S_{DV}$ is continued for a while, and the boost switching element Q1 continues the on/off state. However, since the AC input is being interrupted, a source-drain voltage $V_{ds}$ of the boost switching element Q1 remains at zero, as illustrated in FIG. 7E, so that the feedback voltage $V_{FB}$ does not increase and continues to decrease.

Thus, when the AC power supply is interrupted, the current flowing through the current detection resistor $R_{cs}$ becomes zero, whereby the output signal of the comparator 22b of the zero current detection unit 22 remains at high level, and, as illustrated in FIG. 7B, the zero current detection signal ZCD remaining at high level substantially at the time point t2 is output to the input interruption detection unit 28. In addition, regarding the zero current detection signal ZCD, when the AC power supply voltage is normally applied, and switching operation of the boost switching element Q1 is normally performed, a high-level pulse is generated at a time when the switching element is switched from off to on, as described above. However, for descriptive simplification, the pulse is not illustrated in FIG. 7B, which illustrates only the high-level signal generated upon the interruption of the AC power supply.

Due to that, the high-level zero current detection signal ZCD is stored at a time point t3 when the drive pulse signal QQ of the RS type flip flop 29d of the drive signal generation unit 29 falls from the affirmative output terminal Q of the D type flip flop 28a, and is supplied as the input interruption detection signal ACS rising at high level to the RS type flip flops 28b and 28c, as illustrated in FIG. 7H, so that the RS type flip flops 28b and 28c are set.

Accordingly, a high-level output signal output from the affirmative output terminal Q of the RS type flip flop 28b is supplied to the N-channel MOSFET 42b via the OR gate 42f of the pull-down control unit 42. Consequently, the N-channel MOSFET 42b is turned on, and thereby an operation of pulling down the output of the error amplifier 21 is started. In addition, at the time point (t3), since the input interruption detection signal ACS rises at high level, the OR gate 41e receives the high-level input interruption detection signal ACS. This turns off the P-channel MOSFET 41a, so that pull-up of the output of the error amplifier 21 is stopped (halted). Thus, the pull-up control unit 41 is configured to stop pulling up the output voltage of the error amplifier 21 when the input interruption detection unit 28 detects the interruption state of the AC input voltage (i.e., when the input interruption detection signal ACS rises at high level).

Therefore, as illustrated in FIG. 7I, the error signal $V_{COMP}$ decreases with a relatively steep gradient.

Simultaneously with this, a high-level affirmative output signal of the RS type flip flop 28c is supplied to the slope control terminal SC of the ramp oscillation unit 27. Thus, in the ramp oscillation unit 27, the high-level affirmative output signal is inverted to low level by the logic inverting circuit 27j and supplied to the P-channel MOSFET 27c to turn on the P-channel MOSFET 27c. Accordingly, the constant currents of the first constant current circuit 27a and the second constant current circuit 27b are added together and supplied to the charge/discharge capacitor Ct, whereby the charge/discharge capacitor Ct is rapidly charged. Thus, the ramp oscillation unit 27 outputs the sawtooth wave ramp signal Ramp with a large rising slope, as illustrated in FIG. 7M, to the pulse width modulation comparator 29b.

Due to that, the pulse width of the pulse width modulation signal output from the pulse width modulation comparator 29b on the basis of the same error signal $V_{COMP}$ becomes narrower than when the signal supplied to the slope control terminal SC is at low level.

Note that since the zero current detection signal ZCD output from the zero current detection unit 22 is maintained at high level, the start signal generation unit 29a cannot form a one-shot signal $S_{OS}$ on the basis of the zero current detection signal ZCD. In case of that, the restart timer 29g generates a start signal on the basis of the drive pulse signal QQ of the RS type flip flop 29d, and the start signal is supplied to the OR gate 52.

Then, when the error signal $V_{COMP}$ reaches the switching halt threshold, i.e., the first referential voltage $V_{ref71}$ of the ramp oscillation unit 27 at a time point t4, the output of the pulse width modulation comparator 29b is always at high level, and the reset-priority RS type flip flop 29d is always reset, so that the output of the drive signal $S_{DV}$ is halted, as illustrated in FIG. 7G.

Additionally, when the error signal $V_{COMP}$ continues to decrease due to function of the pull-down control unit 42, and becomes equal to or lower than the referential voltage $V_{ref5}$ of the light load state detection unit 25 at a time point t5, the light load detection signal LLD output from the comparator 25a goes to high level. Due to this, the RS type flip flop 28b of the input interruption detection unit 28 is reset, and the output thereof goes to low level.

In this case, since the control voltage $V_{cc}$ does not decrease to equal to or lower than the referential voltage $V_{ref3}$ of the undervoltage lockout unit 23, the undervoltage lockout signal UVLO is maintained at low level. Thus, the output of the OR gate 42f of the pull-down control unit 42 goes to low level, so that the N-channel MOSFET 42b is turned off, and thereby the pull-down operation by the pull-down control unit 42 is halted. As a result, an original function of the error amplifier 21 for trying to increase the error signal $V_{COMP}$ on the basis of a difference between the two input signals starts to work, and thereby the error signal $V_{COMP}$ starts to rise at the time point t5.

However, due to the steep slope of the rising of the ramp signal ramp output from the ramp oscillation unit 27, the on-state width of the pulse width modulation signal output from the pulse width modulation comparator 29b is limited to be narrow. Therefore, even when the error signal $V_{COMP}$ is large to some extent at the time of restoration of input from the AC power supply, the on-time of the boost switching element Q1 becomes shorter than usual, which enables exhibition of the soft-start function.

After that, when, at a time point t6, the error signal $V_{COMP}$ exceeds the second referential voltage $V_{ref72}$ serving as the switching halt threshold, the pulse width modulation comparator 29b again outputs a pulse width modulation signal, and the RS type flip flop 29d is no longer in the always reset state. Thus, the drive pulse signal QQ is output from the affirmative output terminal Q, and the drive signal $S_{DV}$ is output to the gate of the boost switching element Q1 from the output terminal OUT.

However, even at the time point t6, the AC input voltage Vin continues to be interrupted, so that the zero current detection signal ZCD output from the zero current detection unit 22 is maintained at high level. The source-drain voltage $V_{ds}$ of the boost switching element Q1 also remains at zero, as illustrated in FIG. 7E.

On the other hand, when the feedback voltage $V_{FB}$ decreases to equal to or lower than the referential voltage $V_{ref4}$ of the power factor control operation detection unit 24, the power factor correction operation detection signal PFC_OK that is the output signal of the comparator 24a is inverted from high level to low level, as illustrated in FIG. 7D.

In this state, since the supply of the AC input voltage $V_{in}$ still continues to be interrupted, the decreasing tendency of the feedback voltage $V_{FB}$ continues, as illustrated in FIG. 7C.

Then, when the supply of the AC input voltage $V_{in}$ is restarted at a time point t7, the zero current detection signal ZCD is inverted from high level to low level, followed by the normal operation in which in response to switching of the switching element, the zero current detection signal ZCD goes to high level only during a period of zero current or a small current after the vicinity thereof.

In other words, the start signal generation unit 29a starts to generate a start signal based on the zero current detection signal ZCD, and the RS type flip flop 29d is sequentially set by the one-shot pulse $P_{OS}$ based on the zero current detection signal ZCD.

The feedback voltage VFB starts to increase at the time point t7 where switching of the switching element is started. However, since the ramp signal Ramp output from the lamp oscillation unit 27 has a steep rising slope at the time point t7, the period of the on-state of the boost switching element Q1 is limited to be short, so that the soft-start function is exhibited.

After that, at a time point t8, the feedback voltage $V_{FB}$ exceeds the referential voltage $V_{ref4}$ of the power factor control operation detecting unit 24, so that the power factor correction operation detection signal PFC_OK that is the output signal of the comparator 24a is inverted from low level to high level, as illustrated in FIG. 7D. Thus, the RS type flip flop 28c of the input interruption detection unit 28 is reset, and the output signal input to the slope control terminal SC of the ramp oscillation unit 27 is inverted to low level.

Accordingly, the P-channel MOSFET 27c of the ramp oscillation unit 27 is controlled to be in the off-state, and the charge current that is supplied to the charge/discharge capacitor Ct is limited only to the constant current of the first constant current circuit 27a. Therefore, an increase rate (dV/dt) of the inter-terminal voltage of the charge/discharge capacitor Ct becomes small, and the rising slope of the sawtooth wave becomes gradual. Since the ramp signal Ramp is input to the pulse width modulation comparator 29b of the drive signal generation unit 29, the on-width of the pulse width modulation signal is widened, which increases the increase rate of the feedback voltage $V_{FB}$.

As described above, according to the above embodiment, when a momentary halt of AC input voltage occurs, the input interruption detection unit 28 detects the interruption state of the AC input voltage, and, while the interruption state of the AC input voltage is continuing, the slope control of the sawtooth wave is performed that controls the rising slope of the ramp signal Ramp output from the ramp oscillation unit 27 so that the rising slope thereof becomes larger than the slope obtained when there is no occurrence of interruption of the AC input voltage.

By doing this, upon the occurrence of a momentary halt of AC input voltage, the pulse width of the on-state of the drive signal supplied to the switching element included in the boost chopper is limited to be narrow, which enables exhibition of the soft-start function. Accordingly, the occurrence of overshoot at a momentary halt or at startup can be suppressed.

Furthermore, in the structure for exhibiting the soft-start function, the series circuit including the constant current circuit and the switch unit is arranged in parallel with the constant current circuit configured to charge the charge/discharge capacitor of the ramp oscillation unit 27, and the slope of the sawtooth wave can be easily changed by merely opening and closing the switch unit.

Additionally, the response characteristics of the error amplifier 21 are controlled by the pull-up control unit 41 and the pull-down control unit 42. Then, when interruption of AC input voltage is detected, the pull-up operation of the pull-up control unit 41 for improving the response characteristics of the error amplifier 21 is limited until the control voltage exceeds the first referential voltage. This can prevent the occurrence of an overvoltage state due to excessive pull-up operation after restoration of the AC input voltage.

Incidentally, when the above-described embodiment does not include the input interruption detection unit 28, the slope of the sawtooth wave of the ramp oscillation unit 27 cannot be controlled. Due to that, the soft-start function cannot be exhibited by limiting the pulse width of the drive signal supplied to the switching element of the boost converter at a momentary halt of the AC power supply, which may cause overshoot.

Figure 8:
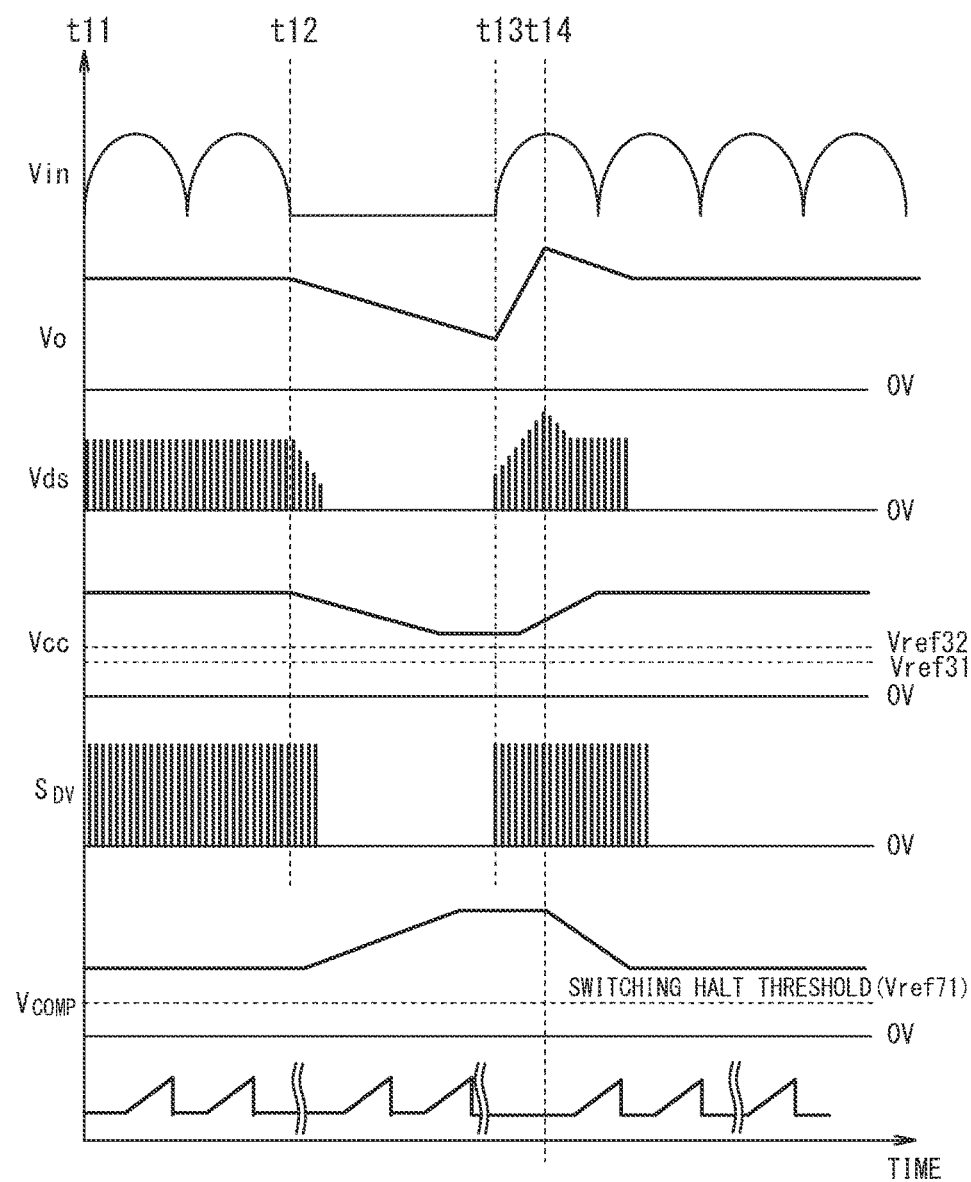
FIG. 8 is a signal waveform diagram illustrating operation in a case where a momentary halt state of AC input voltage is short when no input interruption detection unit is provided.

First, as illustrated in FIG. 8, consider a case where, at the momentary halt of the AC power supply, the control voltage $V_{cc}$ does not decrease to equal to or lower than the referential voltage $V_{ref31}$ of the undervoltage lockout unit 23, and the undervoltage lockout signal UVLO does not go to high level. At a time point t12 when the AC power supply halts, the feedback voltage $V_{FB}$ decreases, and the control voltage $V_{cc}$ also decreases. Unlike the above-described embodiment, even in the state where the AC power supply has halted, the output signal of the RS type flip flop 28b set by the input interruption detection signal ACS is not input to the OR gate 42f of the pull-down control unit 42. Therefore, the pull-down operation is not executed. In addition, since the high-level input interruption detection signal ACS is not input to the OR gate 41e of the pull-up control unit 41, the pull-up operation is executed to increase the error signal $V_{comp}$. Furthermore, since the rising slope of the ramp signal Ramp output from the ramp oscillation unit 27 does not change, the soft-start function cannot be exhibited.

After that, at a time point t13, the input from the AC power supply is restarted. Since the error signal $V_{COMP}$ is excessively large due to the pull-up operation of the pull-up control unit, the output voltage $V_o$ rapidly increases with a large slope accordingly, which causes overshoot at a time point t14.

Figure 9:
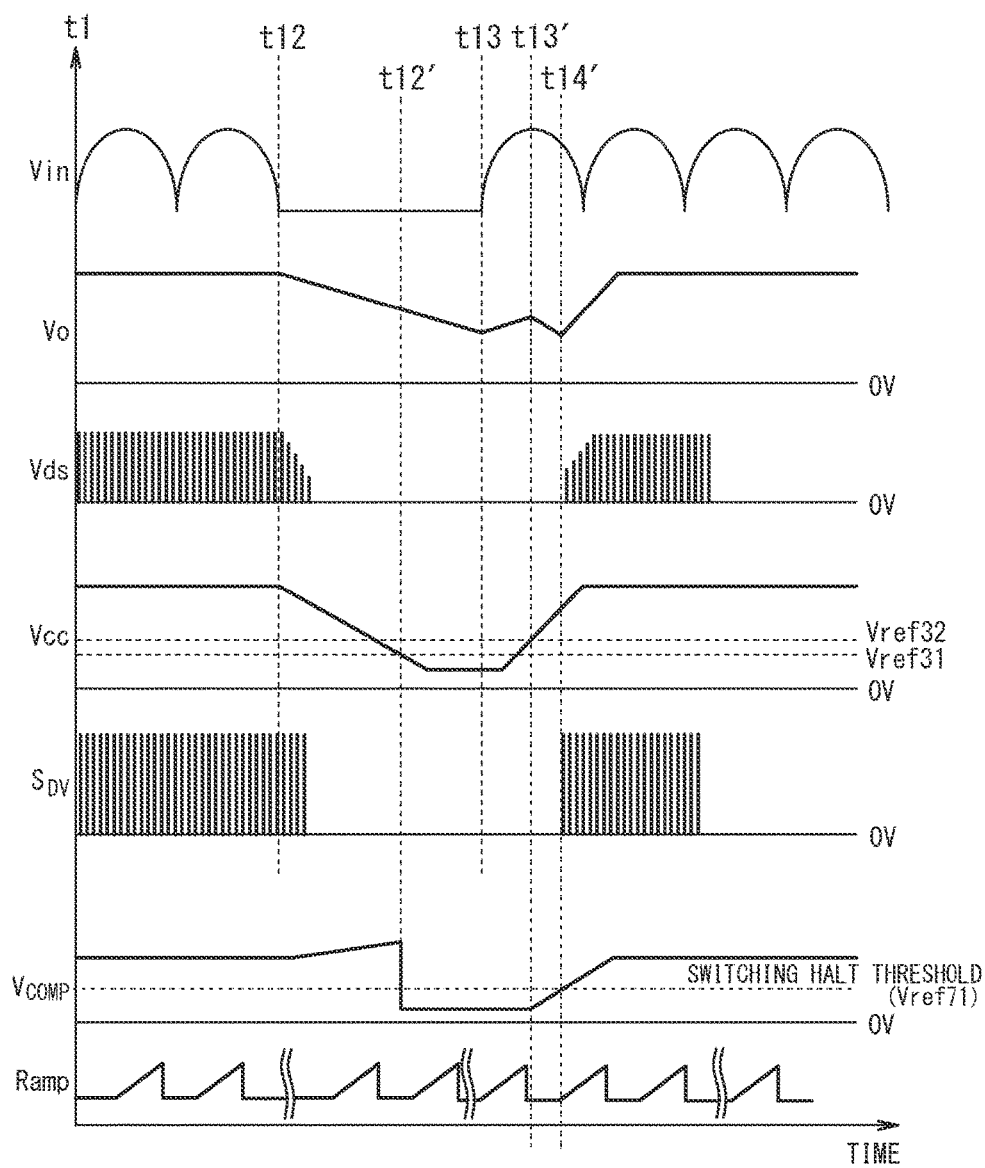
FIG. 9 is a signal waveform diagram illustrating operation in a case where the momentary halt state of AC input voltage is long when no input interruption detection unit is provided.

On the other hand, when the momentary halt of the AC power supply is prolonged, and the control voltage $V_{cc}$ decreases to equal to or lower than the referential voltage $V_{ref31}$ of the undervoltage lockout unit 23, the undervoltage lockout signal UVLO goes to high level at a time point t12' when the control voltage $V_{cc}$ reaches the referential voltage $V_{ref31}$ of the undervoltage lockout unit 23, as illustrated in FIG. 9.

As a result, the RS type flip flop 41d is reset, whereby the input of the negative logic input terminal of the OR gate 41e goes to low level, whereas the output of the OR gate 41e goes to high level, which halts the pull-up operation of the pull-up control unit 41. Additionally, the N-channel MOSFET 42b of the pull-down control unit 42 is turned on, whereby the pull-down operation on the output of the error amplifier 21 is executed, and the error signal $V_{COMP}$ is fixed to a lower voltage than the switching halt threshold.

After that, when, at the time point t13, the supply of the AC input voltage from the AC power supply is restarted, the feedback voltage $V_{FB}$ increases accordingly, and the control voltage $V_{cc}$ also increases.

Then, when, at a time point t13', the control voltage $V_{cc}$ reaches the referential voltage $V_{ref32}$ of the undervoltage lockout unit 23, the undervoltage lockout signal UVLO returns to low level, whereby the pull-down operation of the pull-down control unit 42 is cancelled. By doing this, the error amplifier 21 starts normal operation, as a result of which the error signal $V_{COMP}$ increases, and, at a time point t14', the output of the drive signal $S_{DV}$ is restarted. Consequently, the feedback voltage $V_{FB}$ increases. In this case, since the error signal $V_{COMP}$ increases gradually from lower values, the soft-start operation is achieved.

Therefore, without the input interruption detection unit 28, output voltage overshoot would occur when the momentary halt of the AC power supply is short, and the control voltage Vcc does not reach the referential voltage $V_{ref31}$ of the undervoltage lockout unit 23.

The present embodiment includes the input interruption detection unit 28 configured to detect the interruption state of AC power supply. Additionally, when the ramp oscillation unit 27 detects the input interruption state, the slope control is performed to increase the rising slope (dV/dt) of the sawtooth wave. Thus, even at the momentary halt of AC power supply for a short time, the soft-start function can be exhibited, so that output voltage overshoot can be prevented.

Note that while the above embodiment has applied the MOSFET as the boost switching element Q1, a switching element such as an IGBT or a bipolar transistor can also be applied.

REFERENCE SIGNS LIST

1: Switching power supply device
2: AC power supply
3: Full-wave rectification circuit
10: First converter
11: Boost chopper
14: Power factor correction control IC
21: Error amplifier
22: Zero current detection unit
23: Undervoltage lockout unit
24: Power factor control operation detection unit
25: Light load state detection unit
26: Overvoltage protection unit
27: Ramp oscillation unit
28: Input interruption detection unit
40: Response control unit 41: Pull-up control unit
42: Pull-down control unit

The invention claimed is:

1. A power factor correction control circuit configured to switch a switching element based on an inductance current and an output voltage, the switching element controlling the inductance current, the inductance current flowing through an inductor to which a voltage is applied, the voltage being obtained by a rectification circuit rectifying an AC input voltage, the output voltage being generated from the AC input voltage, the power factor correction control circuit comprising:
   an error signal generation unit configured to output an error signal obtained by amplifying a difference between the output voltage and a referential voltage;
   a pulse width modulation unit configured to receive the error signal to generate a pulse width modulation signal to control an on-time of the switching element;
   a zero current detection unit configured to detect zero current in the inductance current; and
   an input interruption detection unit configured to detect an interruption state of the AC input voltage based on a detection signal of the zero current detection unit,
   wherein the input interruption detection unit causes the pulse width modulation unit to shorten the on-time of the switching element when the input interruption detection unit detects the input interruption state.

2. The power factor correction control circuit according to claim 1, further comprising a response control unit configured to control response characteristics of the error signal generation unit, wherein the response control unit changes the error signal.

3. The power factor correction control circuit according to claim 2, wherein the response control unit includes a pull-up control unit configured to pull up an output of the error signal generation unit based on the output voltage.

4. The power factor correction control circuit according to claim 3, wherein the pull-up control unit pulls up the output of the error signal generation unit when the output voltage decreases.

5. The power factor correction control circuit according to claim 3, wherein the pull-up control unit does not pull up the output of the error signal generation unit in a case where the input interruption detection unit causes the pulse width modulation unit to shorten the on-time of the switching element.

6. The power factor correction control circuit according to claim 2, wherein the response control unit includes a pull-down control unit configured to pull down an output of the error signal generation unit based on the output voltage.

7. The power factor correction control circuit according to claim 6, wherein the pull-down control unit pulls down the output of the error signal generation unit in a case where the input interruption detection unit causes the pulse width modulation unit to shorten the on-time of the switching element.

8. The power factor correction control circuit according to claim 1, wherein the input interruption detection unit determines that the interruption state occurs when the zero current detection unit detects the zero current at a timing when the switching element turns off.

9. The power factor correction control circuit according to claim 8, wherein the input interruption detection unit includes:
   a D type flip flop having a data terminal receiving the detection signal of the zero current detection unit and a clock terminal receiving a drive signal that switches the switching element; and
   an RS type flip flop configured to hold an output signal of the D type flip flop.

10. The power factor correction control circuit according to claim 1, further comprising an undervoltage lockout unit configured to generate an undervoltage lockout signal for preventing a malfunction due to low input control voltage.

11. The power factor correction control circuit according to claim 1, further comprising an oscillation unit configured to output a triangular wave signal to the pulse width modulation unit, wherein the pulse width modulation unit generates the pulse width modulation signal by comparing the error signal and the triangular wave signal.

12. The power factor correction control circuit according to claim 11, wherein the input interruption detection unit increases a slope of the triangular wave signal when the input interruption detection unit detects the input interruption state.

* * * * *